United States Patent

Tanii

[11] Patent Number: 5,082,553
[45] Date of Patent: Jan. 21, 1992

[54] CONCRETE AGGREGATE COLLECTING APPARATUS

[76] Inventor: Masao Tanii, 1351, Arao, Arao-shi, Kumamoto-ken, Japan

[21] Appl. No.: 629,143

[22] Filed: Dec. 18, 1990

[51] Int. Cl.⁵ .......................... B07B 1/22; B07B 1/50
[52] U.S. Cl. ...................................... 209/3; 209/239; 209/240; 209/270; 209/288; 209/369; 209/379; 366/18; 366/60; 366/601
[58] Field of Search .................. 209/3, 235, 239, 240, 209/243, 246, 268, 270, 284, 288, 293, 379, 369; 366/18, 30, 60, 601, 228

[56] References Cited

U.S. PATENT DOCUMENTS

| | | | |
|---|---|---|---|
| 2,315,281 | 3/1943 | Smith | 209/270 X |
| 2,942,731 | 6/1960 | Soldini | 209/293 |
| 4,127,478 | 11/1978 | Miller | 209/270 X |
| 4,435,081 | 3/1984 | Del Fabbro | 366/18 |
| 4,543,180 | 9/1985 | Riker | 366/228 X |
| 4,636,304 | 1/1987 | Hoppe | 209/379 X |

*Primary Examiner*—Donald T. Hajec
*Attorney, Agent, or Firm*—Wood, Phillips, Mason, Recktenwald & Van Santen

[57] ABSTRACT

An aggregate collecting apparatus. A meter which measures the gross weight of the rotary drum is linked to the speed change gear for the rotary drum in such a manner as to be operationally connectable therewith so that the speed of rotation of the drum can be varied in accordance with variations in the amount of sludge charged in the drum. The upstream and downstream edges of a trommel in the rotary drum are intermittently twisted in each of opposite directions so that gravel clogging the trommel is automatically removed.

2 Claims, 5 Drawing Sheets

CONCRETE AGGREGATE COLLECTING APPARATUS

BACKGROUND OF THE INVENTION

1. Field of the Invention

The present invention relates to an apparatus for collecting an aggregate such as gravel and sand from the so-called returned ready-mixed concrete remaining in the tank of a concrete mixer truck which has transported a batch of ready-mixed concrete to the construction site, discharged it for placing, then returned to the concrete plant, and from the drain water discharged when washing the mixer truck.

2. Description of the Related Art

If a batch of ready-mixed concrete is transported to the construction site, and then the amount of the ready-mixed concrete is found to be insufficient during a placing operation, the placing must be interrupted until the shortage is fulfilled by a corresponding amount of ready-mixed concrete transported to the construction site for placing. The interruption of the placing operation results in a seam being formed in the concrete structure, which may have various adverse influences on the structure. For this reason, when ready-mixed concrete is to be transported, the actual practice is that an amount of ready-mixed concrete which is more than that needed is loaded on the mixer truck so that the amount of ready-mixed concrete at the construction site will not be insufficient.

As a result, in most of such actual cases, some of the ready-mixed concrete remains in the tank of the mixer truck after the required amount has been discharged from the tank at the construction site. Consequently, when the tank is washed, the drain water often contains a large amount of sand and gravel (hereinafter referred to as "sludge") which must be disposed of in a suitable place.

If the sand and the gravel are separated from the sludge, then re-used, this is advantageous in that a place for disposing the sludge is not needed. For this purpose, aggregate collecting apparatuses of various types have been proposed.

For instance, an aggregate collecting apparatus used for this purpose has a horizontal-type rotary drum the interior of which is partitioned by doughnut-shaped partition plates into three tanks, namely, a mixing and washing tank, an overflow-water transfer tank, and a trommel tank, which are sequentially arranged from the upstream side of the drum. The rotary drum is rotated at a constant speed, and sludge is charged onto the bottom of the mixing and washing tank so as to be mixed with water and washed thereby. After the mixing and washing, the sludge is scooped up from the bottom, then fed into the trommel of the trommel tank. In this tank, while the sludge is washed by fresh water being supplemented, the gravel and the sand contained in the sludge are classified and are collected. The water used in the trommel tank is allowed to flow over the partition plate between the trommel tank and the overflow-water transfer tank, thereby transferring the water to the transfer tank. Next, the water is carried by a bucket, then returned to the mixing and washing tank where the water will be used to wash newly charged sludge.

This collecting apparatus is very convenient because when sludge is charged, the gravel and the sand contained therein can be automatically separated from each other and collected.

However, since the rotary drum rotates at a speed of rotation which is constant whether the amount of sludge in the drum is large or small, the amount of sludge that can be charged in the rotary drum and processed thereby at one time is inevitably limited and cannot be increased over an upper limit. In addition, when the amount of sludge charged is small, the rotational speed of the drum can be excessively high relative to the charged amount, thereby resulting in another problem in which the sand is stirred too much to be separated, and hence, resulting in a reduction in the proportion of the sand collected.

Furthermore, clogging of the trommel cannot be prevented. In order to clean the trommel, the rotation of the trommel must be stopped, and a worker must crawl into the trommel. Thus, the work of cleaning the trommel is considerably difficult, requires a great amount of labor, and involves consumption of time.

SUMMARY OF THE INVENTION

An object of the present invention is to prevent hindrance of the sludge processing efficiency and a reduction in the proportion of sand collected, which are problems caused by a constant speed of rotation of the rotary drum of a conventional aggregate collecting apparatus in spite of variations in the amount of the sludge charged.

Another object of the present invention is to prevent clogging of the trommel, and enable cleaning of the trommel to be performed easily and within a short period.

According to the present invention, there is provided an apparatus for collecting aggregate having a horizontal-type rotary drum and doughnut-shaped partition plates partitioning the interior of the drum into a mixing and washing tank, an overflow-water transfer tank and a trommel tank which are sequentially arranged from the upstream side of the drum, the apparatus comprising: a meter which measures the gross weight of the rotary drum; a speed change gear for the rotary drum, the speed change gear being linked with the meter in such a manner that the meter and the gear are operationally connectable with each other; a trommel concentrically and rotatably disposed in the trommel tank, the trommel being arranged in such a manner that its upstream and downstream edges can have different angular deviations from the axis of the trommel; a pair of driving pawls provided at upstream and downstream end positions of the trommel tank; a pair of driven pawls provided at upstream and downstream edge positions of the trommel, the upstream driving pawl being engageable with the upstream driven pawl, the downstream driving pawl being engageable with the downstream driven pawl, at least one of the mutually engageable driving and driven pawls at the upstream positions has a width measured in the direction of rotation which is different from the width of the corresponding one of the mutually engageable driving and driven pawls at the downstream positions; and an inspection window with a door which is provided at a position on the outside of the trommel.

The above objects and the construction most suitable for the objects will more fully appear from the following description when the same is read in connection with the accompanying drawings.

DESCRIPTION OF THE PREFERRED EMBODIMENT

The preferred embodiment of the present invention will now be described with reference to the accompanying drawings.

Figure 1:
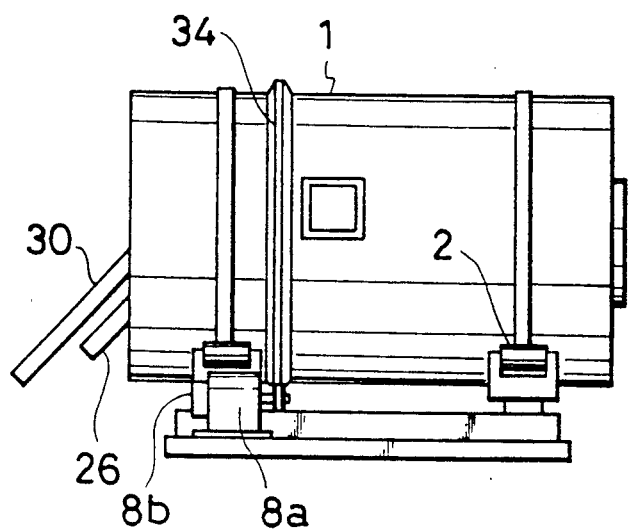
FIG. 1 is a front view of an aggregate collecting apparatus according to the present invention.
Figure 3:
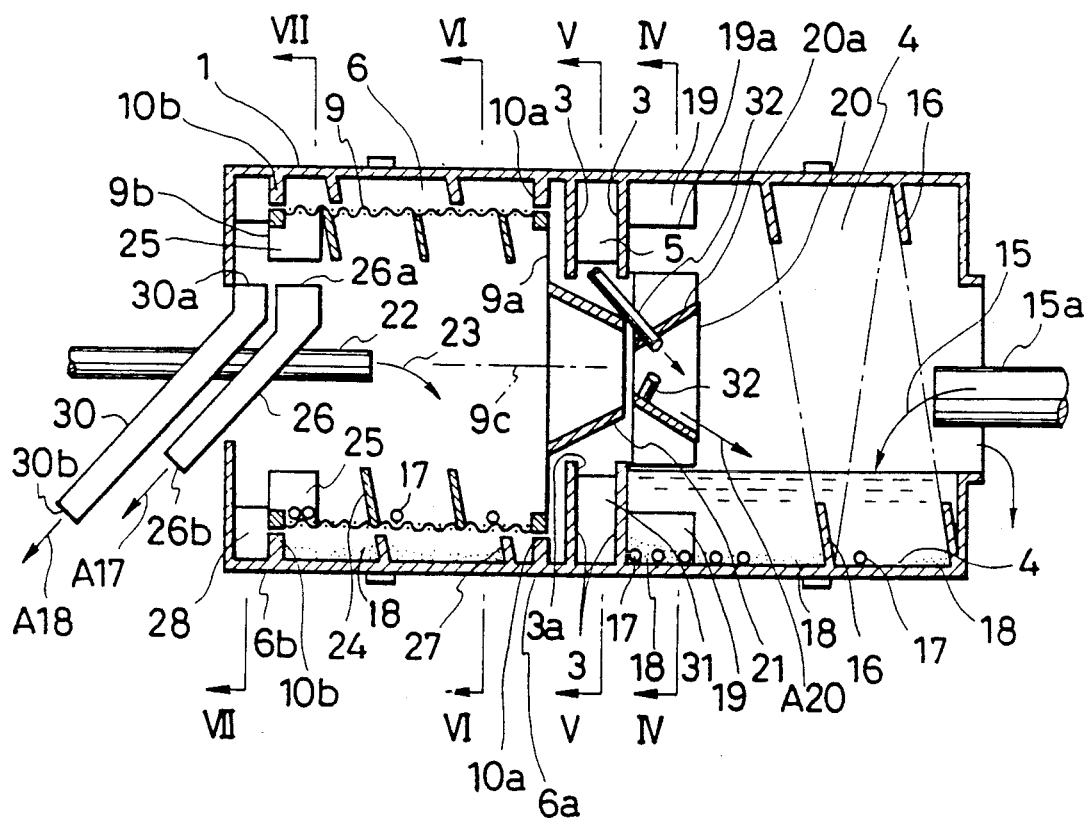
FIG. 3 a fragmentary, enlarged sectional view of the apparatus.
Figure 4:
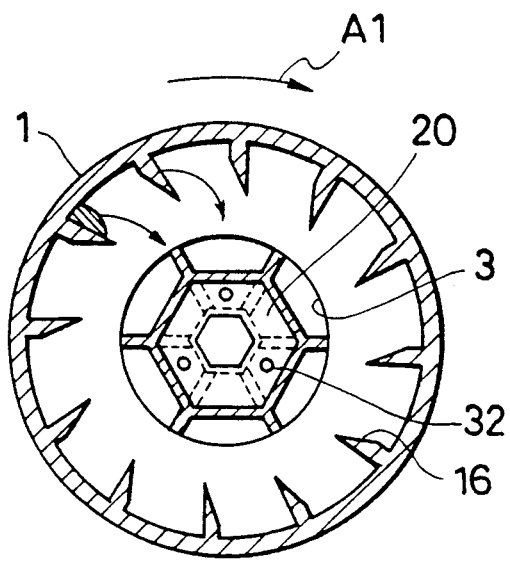
FIG. 4 is a sectional view taken along the line IV—IV shown in FIG. 3.

A horizontal-type rotary drum 1, shown in FIG. 1, is supported by rollers 2. The interior of the rotary drum 1 is partitioned, as shown in FIG. 3, by doughnut-shaped partition plates 3 into a mixing and washing tank 4, an overflow-water transfer tank 5 and a trommel tank 6 which are sequentially arranged from the upstream of the direction in which sludge 15 is fed from a charge conduit 15a. The above-described members constitute the basic structure of an aggregate collecting apparatus.

A meter 7 for measuring the amount of sludge charged into the rotary drum 1 of the apparatus is linked by a link means 8a with a speed change gear 8b for a motor 8a for driving the rotary drum 1.

Figure 8:
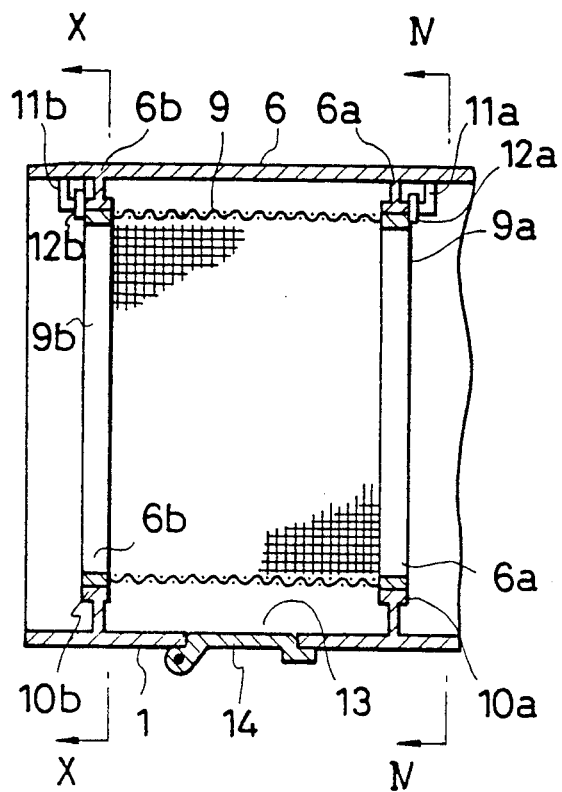
FIG. 8 is an enlarged sectional view of a part of the apparatus shown in FIG. 3.
Figure 9:
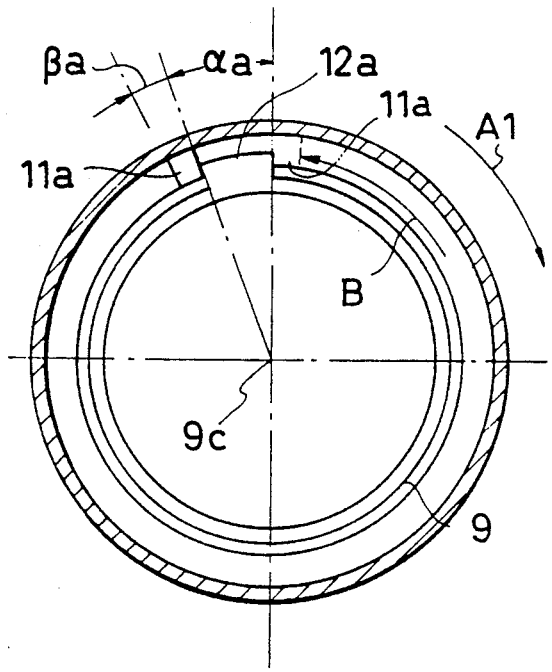
FIG. 9 is a sectional view taken along the line IX—IX shown in FIG. 8.
Figure 10:
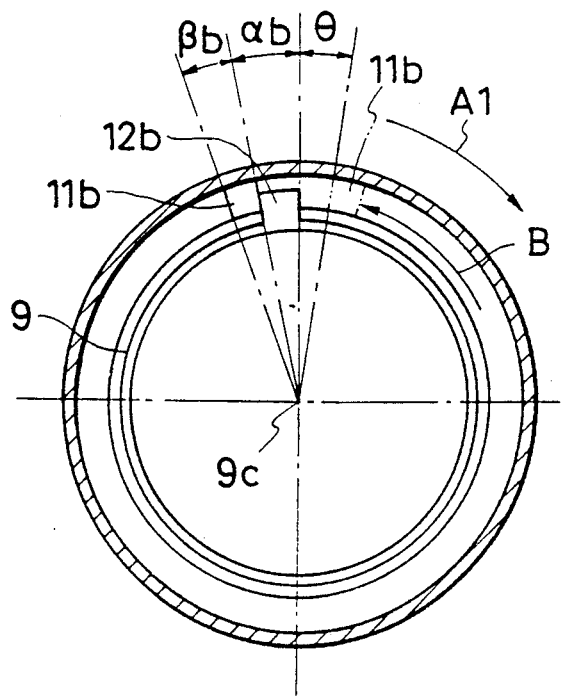
FIG. 10 is a sectional view taken along the line X—X shown in FIG. 8.

A trommel 9, shown in FIG. 3, is provided in the trommel tank 6 while being concentrically and rotatably supported by support annuli 10a and 10b. The trommel 9 has upstream and downstream edges 9a and 9b which can be slightly twisted in such a manner that an angular shift $\theta$ is produced relative to the axis 9c of the trommel 9. As shown in FIG. 8, the trommel tank 6 has upstream and downstream ends 6a and 6b on which a pair of driving pawls 11a and 11b are respectively provided. On the other hand, a pair of driven pawls 12a and 12b are respectively provided on the upstream and downstream edges 9a and 9b of the trommel 9. The upstream driving pawl 11a is engageable with the upstream driven pawl 12a, and the downstream driving pawl 11b is engageable with the downstream driven pawl 12b. The upstream and downstream driving pawls 11a and 11b have central angles $\beta a$ and $\beta b$, respectively, and the upstream and downstream driven pawls 12a and 12b have central angles $\alpha a$ and $\alpha b$, respectively. These central angles are such that the central angle of at least one of the mutually engageable driving and driven pawls 11a and 12a at the upstream positions is different from the central angle of the corresponding one of the mutually engageable driving and driven pawls 11b and 12b at the downstream positions. For instance, as shown in FIGS. 9 and 10, the central angle $\alpha a$ of the driven pawl 12a is greater than the central angle $\alpha b$ of the driven pawl 12b, while the central angle $\beta a$ of the driving pawl 11a is substantially equal to the central angle $\beta b$ of the driving pawl 11b. Alternatively, the central angles $\alpha a$ and $\alpha b$ may be substantially equal to each other but be greater than the central angle $\beta a$. Or, there may be differences in both between the central angles $\alpha a$ and $\alpha b$, and between the central angles $\beta a$ and $\beta b$.

The apparatus further includes an inspection window 13 and a door 14 thereof which are provided at a position of the rotary drum 1 on the outside of the trommel 9.

When aggregate is to be collected by employing the apparatus, the rotary drum 1 is rotated at a certain speed of rotation. In this condition, sludge to be processed is charged onto the bottom of the mixing and washing tank 4 so that the sludge is subjected to washing and mixing by a screw conveyer 16 provided on the inner wall of the tank 4. Thereafter, the aggregate such as gravel 17 and sand 18 contained in the sludge is scooped up from the bottom by scooping blades 19 provided on the inner wall of the tank 4. Then, the radially inner ends 19a of the blades 19 are directed downward so that the aggregate on the blades 19 falls on the upper surface 20a of a pyramid-shaped hollow guide 20 which is concentrically provided at a central position. The aggregate is guided from the upper surface 20a of the guide 20 to the inner surface of a pyramidal hopper 21 provided at the upstream end 6a of the tank 6 where the trommel 9 opens, so as to be fed into the trommel 9. In the trommel 9, while the aggregate is washed by fresh water 23 being supplemented from a water supply pipe 22, the aggregate is moved from the upstream end 6a toward the downstream end 6b by a screw conveyer 24 made of a material containing sand and formed on the inner wall of the trommel 9. The trommel 9 extending between these ends classifies the aggregate into gravel and sand. The gravel remains in the trommel 9 while the sand is discharged to the space between the trommel 9 and the corresponding inner surface of the rotary drum 1. The gravel 17 is scooped up by gravel scooping blades 25 formed at a downstream position of the inner surface of the trommel 9, then supplied through an inlet 26a at the upper end of a gravel chute 26 into the chute 26. The gravel 17 is then discharged through an outlet 26b, as indicated by an arrow A17. On the other hand, the sand 18 discharged to the space is moved, by a sand screw conveyer 27 provided on the inner surface of the rotary drum 1, to the downstream end where the sand 18 is the scooped up by sand scooping blades 28, supplied to an inlet 30a of a sand chute 30, and discharged through an outlet 30b, as indicated by an arrow A18.

Figure 5:
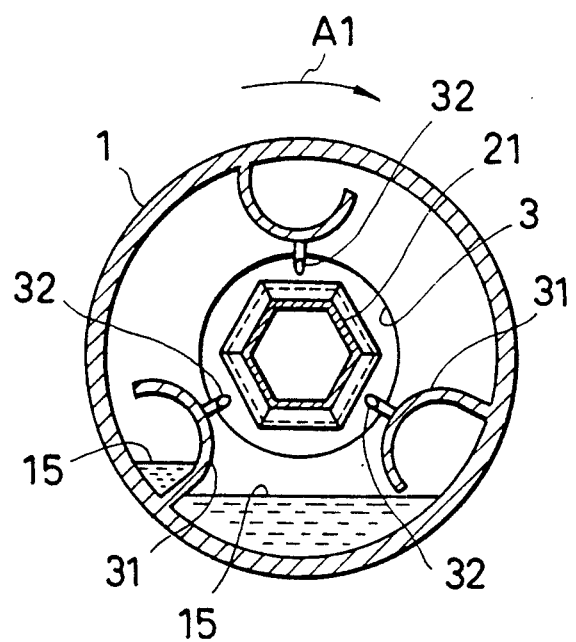
FIG. 5 is a sectional view taken along the line V—V shown in FIG. 3.
Figure 6:
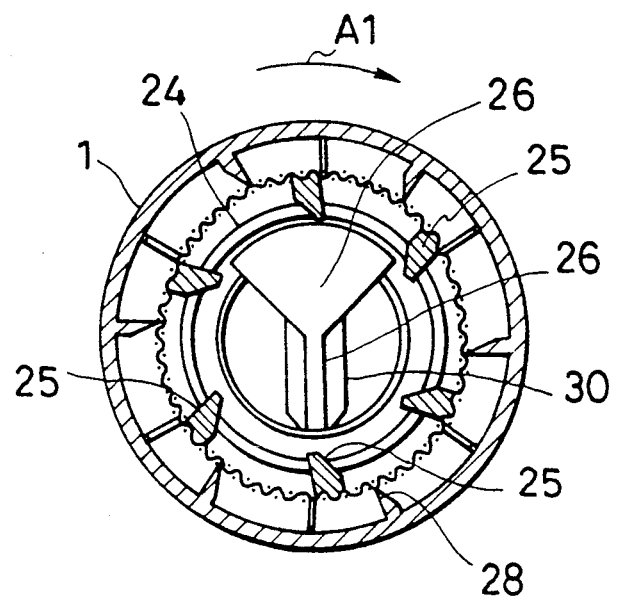
FIG. 6 is a sectional view taken along the line VI—VI shown in FIG. 3.
Figure 7:
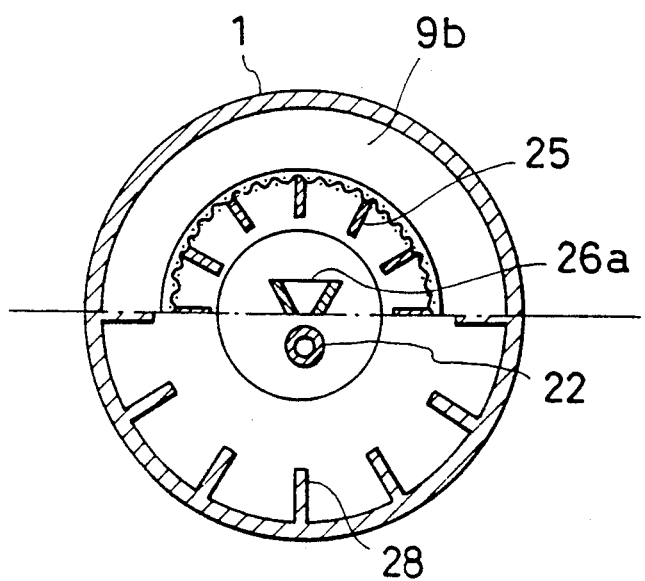
FIG. 7 is a sectional view taken along the line VII—VII shown in FIG. 3.

The water 23, which has been supplied from the water supply pipe 22 into the trommel 9, then used to wash the gravel and the sand, is allowed to flow over the radially inner edge 3a of one of the doughnut-shaped partition plates 3 which is between the tanks 6 and 5, so that the water flows from the trommel tank 6 into the overflow-water transfer tank 5. The transferred water is carried by buckets 31 which are, as shown in FIGS. 3 and 5, provided on the inner wall of the rotary drum 1. The water is allowed to flow downward through communication pipes 32 opening at the bottom of the buckets 31, then flows over the inner surface of the pyramidal guide 20, and then returns to the mixing and washing tank 4, as indicated by an arrow A20. The returned water will again be used to wash sludge which will be charged anew.

While the process is repeated, the amount of the sludge 15 charged in the rotary drum 1, more specifically, the gross weight of the rotary drum 1 with the sludge 15 charged therein, is always and continuously measured by the charge amount meter 7 comprising a weight meter or the like. A signal output from the meter 7 is input, via the link means 8a, to the speed change gear 8b for the rotary drum 1. On the basis of the input, the rotational speed of the rotary drum 1 is automatically controlled to become a speed suitable for the amount of the sludge charged in the process being performed. When the charged amount is large, the rotational speed is raised so as to increase the processing efficiency of the apparatus. On the other hand, when the charged amount is small, the rotational speed is lowered so as to facilitate the collecting of sand in the trommel tank.

Figure 2:
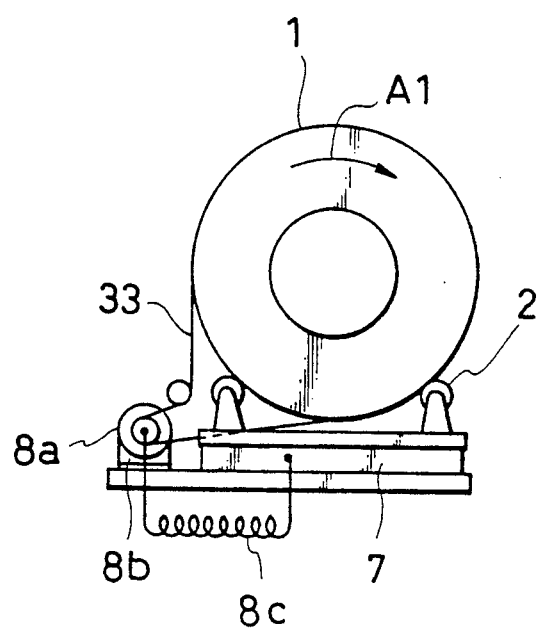
FIG. 2 is a side view of the apparatus.

The rotary drum 1 is rotated in the following manner. The motor 8a which is capable of forward and backward rotation causes, through a chain belt 33 (in FIG. 2) and a sprocket wheel 34 (in FIG. 1), the rotary drum 1 to intermittently and repeatedly rotate in each of the forward and backward directions. Specifically, when the rotary drum 1 is rotated in the forward direction indicated by an arrow A1 in some of the drawings, the driving pawls 11a and 11b, which respectively project radially inward at upstream and downstream ends of the trommel tank 6, and which respectively have the central angles $\beta a$ and $\beta b$ relative to the axis 9c of the trommel 9, come into engagement with the corresponding ones of the driven pawls 12a and 12b, which are respectively formed on the upstream and downstream edges 9a and 9b of the trommel 9 disposed rotatably in the trommel tank 6 and concentrically therewith, and which respectively have the central angles $\alpha a$ and $\alpha b$. The engagement of the driving pawls 11a and 11b with the corresponding driven pawls 12a and 12b enables the rotation of the rotary drum 1 to be transmitted to the trommel 9, which is then rotated.

When the rotation of the rotary drum 1 which has been performed in the A1 direction switches to rotation in the opposite direction, i.e., in the direction B, the driving pawls 11a and 11b become disengaged from the driven pawls 12a and 12b, respectively. Upon this disengagement, the trommel 9 stops rotation due to resistance caused by gravity, etc., to assume a condition in which the trommel 9 is naturally supported by the support annuli 10a and 10b. In the subsequent rotation of the rotary drum 1 in the B direction, the upstream driving pawl 11a is in advance of the downstream driving pawl 11b in the B direction by the central angle $\theta$ ($\theta = (\alpha a + \beta b) - (\alpha b + \beta b)$). Therefore, when the upstream driving pawl 11a has rotated in the B direction through $\{360 - (\alpha a + \alpha b)\}$ degrees to reach a position (indicated by broken lines in FIG. 9) at which the upstream driving pawl 11a abuts on the upstream driven pawl 12a, the downstream driving pawl 11b, which has also rotated in the B direction through the same degrees $(360 - (\alpha a + \alpha b))$, reaches the position indicated by broken lines in FIG. 10, that is, a position which is the central angle $\theta$ behind the position of the downstream driven pawl 12b. Consequently, when the upstream driving pawl 11a in the position shown in FIG. 9 rotates in the B direction and thus drives the corresponding driven pawl 12a, only the upstream edge 9a of the trommel 9 is rotated, with the downstream edge 9b being unrotated. When the trommel 9 has thus become twisted by the angle $\theta$ which corresponds to a shift between the upstream and downstream edges 9a and 9b, the downstream driving pawl 11b moving in the B direction abuts on the downstream driven pawl 12b. As a result, the trommel 9 rotates in the B direction while being twisted by the angle $\theta$. In this way, each time the direction of rotation of the trommel 9 about its axis 9c is switched from one of two opposite directions to the other, the trommel is twisted by the angle $\theta$ alternately in one of two opposite directions and the other.

By virtue of this arrangement, the plain weave mesh of the trommel 9 deforms, for instance, from a rectangular shape to a rhombic shape, or vice versa, thereby enabling gravel clogging the trommel mesh to be removed. If there is substance, such as gravel, foreign matter or mixture thereof, which has not been removed by the changes in the shape of the mesh and which still remains on the trommel 9, the substance can be removed, whenever required, by temporarily stopping the rotation of the rotary drum 1, opening the door 14 of the inspection window 13, inserting, for instance, hand of the operator from the outside of the drum 1, and removing the remaining substance while the trommel is rotated in either the direction A or the direction B.

Aggregate is collected by the apparatus of the present invention in the following manner. The rotary drum is rotated at a certain speed. In this condition, sludge to be processed is charged onto an upstream bottom portion of the interior of the drum which is close to the entrance of the mixing and washing tank. The sludge mixed and washed while being moved downstream by the screw conveyer provided on the inner wall of the mixing and washing tank. The gravel and the sand contained in the sludge are scooped up from the bottom of the tank by the scooping blades provided on the inner wall of the tank, then the scooped gravel and sand are fed to the screw conveyer within the trommel in the trommel tank. In this tank, the gravel and the sand are classified from each other while fresh water is being supplemented, and the gravel and the sand which have been classified are each collected. The water used is allowed to overflow from the trommel tank, thereby transferring the water to the overflow-water transfer tank. The transferred water is carried by the buckets provided on the inner wall of the rotary drum, thereby returning the water to the mixing and washing tank, where the returned water will be used to wash newly charged sludge.

During the repetition of this process, the gross weight of the rotary drum with the sludge charged therein is always and continuously measured by the weight meter. A signal output from the weight meter is input to the speed change gear for the rotary drum, and the rotational speed of the rotary drum is automatically controlled to become a speed suitable for the weight of the sludge currently being processed.

When the apparatus is at rest for a relatively long period, for instance, in the nighttime, the rotary drum is intermittently rotated (generally for 1 to 2 minutes between two 1-hour stoppage periods) in each of the two opposite directions so as to prevent sedimentation and consolidation of the cement component contained in the rotary drum. The intermittent rotation in each of the two opposite directions also serves to axially twist the trommel, with the twisting direction alternating between two opposite directions, whereby a slight angular shift is produced which shift causes the trommel mesh to be deformed so that aggregate clogging the mesh drops therefrom. Repeating the aggregate collecting process requiring a certain period of time inevitably results in gradual increases in the amount of aggregate clogging the trommel mesh. The provision of the inspection window makes it possible for the operator on the outside of the apparatus to remove the clogging aggregate through the window during stoppage periods between operations.

Although the present invention has been described on the basis of the embodiment illustrated in the accompanying drawings, the present invention is not intended to be limited thereto but may be carried out with partial modifications and additions which are within the scope of the present invention. For instance, the speed change gear for the motor may be an inverter, or a mechanical speed change gear.

According to the present invention, an aggregate collecting apparatus has a horizontal-type rotary drum whose interior is partitioned by doughnut-shaped partition plates into a mixing and washing tank, an overflow-water transfer tank and a trommel tank which are sequentially arranged from the upstream side of the drum. The apparatus further has a meter for measuring the amount of sludge charged in the rotary drum, and a speed change gear for the rotary drum, the meter and the speed change gear being linked to and operationally connected with each other. Therefore, it is possible to always and continuously measure the amount of sludge charged in the rotary drum by the charge amount meter, and to input an output signal of the meter to the speed change gear for the rotary drum, so that the speed of rotation of the rotary drum is automatically controlled to a speed which is optimum to the amount of sludge currently charged in the rotary drum. Consequently, it is possible to prevent hindrance of the aggregate collecting efficiency and a reduction in the proportion of sand collected, which are caused by a constant speed of rotation of the rotary drum of the conventional aggregate collecting apparatus in spite of variations in the amount of the sludge charged.

The aggregate collecting apparatus according to the present invention further has a trommel concentrically and rotatably disposed in the trommel tank, the trommel being arranged in such a manner that it can be slightly twisted by an angular shift relative to the axis of the trommel. A pair of driving pawls at upstream and downstream end positions of the trommel tank are engageable with the corresponding ones of a pair of driven pawls at upstream and downstream end positions of the trommel, the pawls having their respective central angles relative to the axis of the trommel. The central angles are such that the central angle of at least one of the mutually engageable driving and driven pawls at the upstream positions is different from the central angle of the corresponding one of the mutually engageable driving and driven pawls at the downstream positions. This arrangement enables, together with an arrangement whereby the rotary drum is intermittently rotated in each of two opposite directions, each change in the direction of rotation to cause the trommel to be slightly twisted relative to its axis. The twisting causes the trommel mesh to be deformed, thereby allowing gravel clogging the trommel mesh to be removed. Consequently, clogging of the trommel can be prevented.

Another feature of the aggregate collecting apparatus according to the present invention is an inspection window and a door which are provided at a position outside the trommel. Therefore, if substance such as gravel and/or foreign matter has not been removed by the intermittent rotation of the trommel in the two alternating directions, the substance can be removed from the trommel by inserting, for instance, hand of an operator from the outside of the rotary drum. In this way, clogging substance can be easily removed.

What is claimed is:

1. An apparatus for collecting aggregate having a horizontal-type rotary drum and doughnut-shaped partition plates partitioning the interior of said drum into a mixing and washing tank, an overflow-water transfer tank and a trommel tank which are sequentially arranged from the upstream side of said drum, said apparatus comprising: a meter for measuring the amount of sludge charged in said rotary drum; a speed change gear for a motor for driving said rotary drum, said speed change gear being linked with said meter in such a manner that said meter and said gear are operationally connectable with each other; a trommel concentrically and rotatably disposed in said trommel tank, said trommel being arranged in such a manner that said trommel can be slightly twisted by an angular shift relative to the axis of said trommel; a pair of driving pawls provided at upstream and downstream end positions of said trommel tank; a pair of driven pawls provided at upstream and downstream edge positions of said trommel, said upstream driving pawl being engageable with said upstream driven pawl, said downstream driving pawl being engageable with said downstream driven pawl, said pawls having their respective central angles relative to the axis of said trommel, said central angles being such that the central angle of at least one of the mutually engageable driving and driven pawls at the upstream positions is different from the central angle of the corresponding one of the mutually engageable driving and driven pawls at the downstream positions; and an inspection window with a door which is provided at a position on the outside of said trommel.

2. An aggregate collecting apparatus according to claim 1, wherein said speed change gear for the drive motor is an inverter.

* * * * *